US012536358B1

(12) United States Patent
Ziv et al.

(10) Patent No.: US 12,536,358 B1
(45) Date of Patent: Jan. 27, 2026

(54) METHOD AND SYSTEM FOR AUTOMATIC BUG LOCALIZATION

(71) Applicant: CADENCE DESIGN SYSTEMS, INC., San Jose, CA (US)

(72) Inventors: Maayan Ziv, Haifa (IL); Ziyad Hanna, Haifa (IL); Alon Hemo, Atlit (IL); Wael Mousa, Nof Hagalil (IL)

(73) Assignee: Cadence Design Systems, Inc., San Jose, CA (US)

( * ) Notice: Subject to any disclaimer, the term of this patent is extended or adjusted under 35 U.S.C. 154(b) by 717 days.

(21) Appl. No.: 17/846,251

(22) Filed: Jun. 22, 2022

(51) Int. Cl.
*G06F 30/367* (2020.01)
*G06F 30/31* (2020.01)

(52) U.S. Cl.
CPC ............ *G06F 30/367* (2020.01); *G06F 30/31* (2020.01)

(58) Field of Classification Search
CPC .................................................... G06F 30/367
USPC ......................................................... 716/106
See application file for complete search history.

(56) References Cited

U.S. PATENT DOCUMENTS

| 8,630,824 | B1* | 1/2014 | Ip | ............................ G06F 30/33 |
| | | | | 714/39 |
| 2014/0136900 | A1* | 5/2014 | Wei | ..................... G06F 11/3692 |
| | | | | 714/37 |
| 2021/0133092 | A1* | 5/2021 | Gao | ..................... G06F 11/3688 |

OTHER PUBLICATIONS

Debjit Pal et al; Symptomatic bug localization for functional debug of hardware designs; 2016 29th International Conference on VLSI Design and 2016 15th International Conference on Embedded Systems; 2016 IEEE; Downloaded on Oct. 26, 2020.

* cited by examiner

*Primary Examiner* — Eric D Lee
(74) *Attorney, Agent, or Firm* — Mark H. Whittenberger, Esq.; Holland & Knight LLP

(57) ABSTRACT

An automated debugging method includes obtaining waveforms of signals recorded during execution of one or a plurality of tests on a first properly functioning version of a design and on a second faulty version of the design, extracting behavior patterns of the signals in the waveforms of the first design and behavior patterns of the signals in the waveforms of the second design, identifying one or more deviations in signals of the extracted behavior patterns, identifying a corresponding simulation time or time window and presenting to a user via an output device code of the second design pertaining to a deviation of the one or more deviations in corresponding behavior patterns of the extracted behavior patterns and the time or time window during which that deviation occurred.

20 Claims, 3 Drawing Sheets

METHOD AND SYSTEM FOR AUTOMATIC BUG LOCALIZATION

FIELD OF THE INVENTION

The present invention relates to verification of electronic designs and more particularly to methods and systems for automatic bug localization.

BACKGROUND

Design verification is a common process for testing a newly designed integrated electronic circuit, board, or system-level architecture, to, for example, confirm that it complies with the requirements defined by the specification of the architecture for that device. Design verification for a device under test (DUT) may be performed on the actual device but is typically performed on a simulation model of the device to be tested, and its verification environment.

Verification of electronic designs typically has three forms. At an early stage, before the electronic design is implemented in hardware, simulation and formal verification can be conducted on a functional model of the design. Another form can be emulation, in which one electronic hardware is used to mimic the behavior of another (tested) electronic hardware. At more advanced stages of design development, a system on chip (SoC) may be verified, in a process which is typically referred to as post-silicon verification. Post-silicon verification can be a last stage in the electronic design development, for example, before it is manufactured.

Debugging functional bugs at SoC level typically involves identifying the Intellectual Property (IP) in which an error occurred and the relevant simulation time or time window in which that error occurred, and that process is time and resource consuming. It may take long hours, days and even weeks to identify and debug an error. Considering the complexity of identifying the root-cause for a bug, automatic bug localization may be extremely valuable in the debugging process.

It may be desired to provide debugging methods and systems that can identify deviations in behavior patterns in waveforms of simulation tests conducted on a first version of a properly functioning design and on a second faulty version of that design and identify the relevant source code in the design that corresponds to these deviations.

SUMMARY

There is thus provided, according to some embodiments of the present invention, a method for automatic bug localization. The method may include obtaining waveforms of signals recorded during execution of one or a plurality of tests on a first properly functioning version of a design. The method may also include obtaining waveforms of signals recorded during execution of the tests on a second faulty version of the design. The method may also include using a processor to: extract first behavior patterns of the signals in the waveforms of the properly functioning version of the design; extract second behavior patterns of the signals in the waveforms of the faulty version of the design; identify one or more deviations in signals of corresponding behavior patterns of the extracted first and second behavior patterns; identify a time or time window for each of said one or more deviations in the signals of the corresponding behavior patterns of the extracted behavior patterns, during which each said deviation occurred during the execution of the tests; and present to a user via an output device code of the faulty version of the design pertaining to a deviation of the one or more deviations in corresponding behavior patterns of the extracted behavior patterns and the time or time window during which each said deviation occurred.

According to some embodiments of the present invention, the method further includes using the processor to present to a user via the output device code of the properly functioning version of the design pertaining to a deviation of the one or more deviations in corresponding behavior patterns of the extracted behavior patterns and the time window during which each said deviation occurred.

According to some embodiments of the present invention, the method includes using the processor to present the code of the properly functioning version of the design and the code of the faulty version of the design side by side on the output device.

According to some embodiments of the present invention, the output device is a display device.

According to some embodiments of the present invention, identifying one or more deviations in corresponding behavior patterns of the extracted behavior patterns comprises identifying behavior patterns that are not found in the waveforms of the faulty version of the design but exist in the waveforms of the of the properly functioning version of the design.

According to some embodiments of the present invention, identifying one or more deviations in corresponding behavior patterns of the extracted behavior patterns comprises identifying behavior patterns that are not found in the waveforms of the properly functioning version of the design but exist in the waveforms of the of the faulty version of the design.

According to some embodiments of the present invention, the method may further include using the processor to validate the signals for either or both versions of the design.

According to some embodiments of the present invention, the method may further include using the processor to rank signals in the waveforms of either the faulty version of the design or the properly functioning version of the design by the number of deviations identified in each of said signals.

According to some embodiments of the present invention, presenting to the user via the output device code of the faulty version of the design pertaining each of said one or more deviations comprises presenting to the user via the output device code of the faulty version of the design pertaining each of said one or more deviations in an order corresponding to a rank of the ranked signals.

According to some embodiments of the present invention, there is provided a debugging system. The system may include memory and a processor. The processor may be configured to record waveforms of signals during execution of one or a plurality of tests on a properly functioning version of a design. The processor may be configured to record waveforms of signals during execution of the one or a plurality of tests on a faulty version of the design. The processor may be configured to extract first behavior patterns of the signals in the waveforms of the properly functioning version of the design. The processor may be configured to extract second behavior patterns of the signals in the waveforms of the faulty version of the design. The processor may be configured to identify one or more deviations in signals of corresponding behavior patterns of the extracted behavior patterns. The processor may be configured to identify a simulation time window for each of said one or more deviations in the signals of the corresponding behavior patterns of the extracted behavior patterns, during which each said deviation occurred during the execution of the one or a plurality of tests; and the processor may be configured to present to a user via an output device code of the second design pertaining to a deviation of the one or more deviations in corresponding behavior patterns of the extracted behavior patterns and the time window during which each said deviation occurred.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

Figure 1:
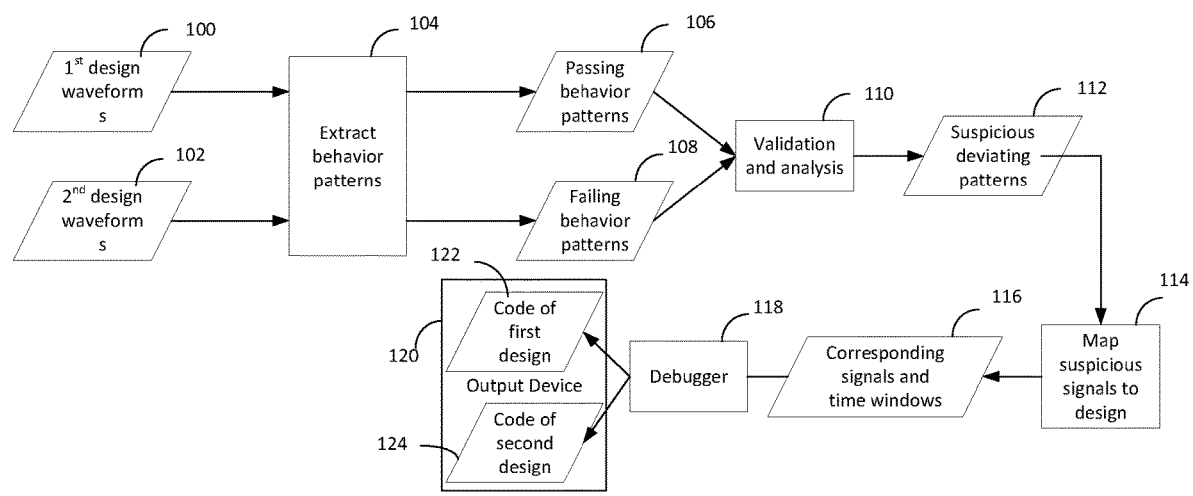
FIG. 1 is a flow diagram of a debugging method, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

According to some embodiments of the present invention, two versions of an electronic design (hereinafter "design" for brevity) may be considered: a first version of the design (sometimes referred herein simply as the "first design") which appears to be properly functioning (successfully passed tests, regressions) and a second version of the design which includes one or a plurality of changes that were made to the first design, and which appears to be faulty when undergoing some tests, passing successfully one or a plurality of tests while failing other one or a plurality of tests (sometimes referred herein simply as the "second design").

According to some embodiments of the invention, during the execution of tests sets of waveforms of signals of various parameters of the design (e.g., signals of the design that are manifested in the code of that design) may be collected. Waveforms may typically be presented in traces, showing a plurality of waveforms over a common timeline. Thus, for each design version of the two versions of the designs a set of waveforms may be obtained.

Identifying differences (e.g., a "diff" operation) between corresponding waveforms of the first design and the second design may sometimes be helpful, but may also be misleading, as values of parameters represented in the waveforms may vary for various reasons and not necessarily directly or indirectly indicate a bug. Furthermore, when a test run fails on the faulty second design the waveform generated in that test run, the collected trace of the failing waveforms may be shorter (sometimes even significantly shorter) than a trace of passing waveforms collected from a successful test run on the properly functioning first design, which may render a simple differentiation not very helpful.

For example, a set of waveforms collected during test runs (e.g., during one or more regression sessions) from a design that underwent some changes may include one or more waveforms that present one or more deviations from corresponding waveforms of the properly functioning design that represent a faulty behavior with respect to the expected desired behavior of a properly functioning design, one or more waveforms that present one or more deviations from corresponding waveforms of the properly functioning design that represent a proper behavior that is expected from the properly functioning design, and one or more waveforms that are similar (e.g., identical) to corresponding waveforms of the properly functioning design, which may provide some context (e.g., with respect to a specific sector of the design, such as, for example, waveforms relating to the same instance).

According to some embodiments of the present invention, an electronic design automation (EDA) tool may obtain (e.g., collect, receive, fetch) waveforms of signals recorded during execution of one or a plurality of tests, e.g., simulation test/s, formal verification test/s or emulation test/s conducted on a first properly functioning version of a design (e.g., in one or more regression sessions)—hereinafter related to as "waveforms of the first design", and waveforms of signals recorded during simulation tests conducted on a second version of that design, which is essentially the same code as the code of first version of the design except for one or more changes that were made in the code, and which was found to exhibit some faulty behavior-hereinafter related to as "waveforms of the second design".

According to some embodiments of the present invention the EDA tool may analyze the waveforms of the first design and the waveforms of the second design to study the behavior of the signals. For example, it may be determined that generally when a certain signal (e.g., signal "a") rose a certain other signal (e.g., signal "b") rose as well, that certain signals (e.g., signal "e" and signal "f") simultaneously rose and drop, that a certain signal (e.g., signal "g") remained constantly with the same value (e.g., "0" or "1").

According to some embodiments of the present invention the EDA tool may analyze the waveforms of the first properly functioning design and extract behavior patterns (also referred to, hereinafter as "signatures") found in these waveforms. For example, if the signal for entity "a" and the signal for entity "b" exhibit some relation, e.g., correlation (e.g., both signals are identical or always in mutex). The relations may refer to concurrent behavior in one to more specific cycles and may also refer to relations of signals not necessarily at the same cycle. For example, given that when certain events (e.g., signal "a" is zero, and signal "b" is zero) occur in one or a plurality of signals concurrently or in different cycles, and it is determined that at yet another cycle an event in one or all of these signals or in other signal occurs (e.g., signal "c" changes from 0 to 1), this may be identified as a behavior pattern. In another example a behavior pattern may be determined when signals "a" and "b" are found to be always in mutex (never the same value). A set of behavior patterns may be extracted from the waveforms of the first design.

According to some embodiments the EDA tool may analyze the waveforms of the second design and determine whether the behavior patterns extracted from the waveforms of the first design exist in the waveforms of the second design.

Similarly, according to some embodiments of the present invention, the EDA tool may analyze the waveforms of the second faulty design and extract behavior patterns in these waveforms, and further analyze the waveforms of the first design to determine whether the behavior patterns extracted from the second design exist in the waveforms of the first design. Looking for behavior patterns in the second faulty design may result in finding suspicious behavior, where the corresponding behavior in the waveforms of the first properly functioning design did not appear to be interesting to investigate (e.g., signals "a" and "b" remained 0 throughout the waveforms).

According to some embodiments of the invention, behavior patterns that are not found in the waveforms of the second design but exist in the waveforms of the of the first design may be indicative of the existence of a bug or bugs in the code of the faulty design (the second design). Similarly, according to some embodiments of the present invention, behavior patterns that are not found in the waveforms of the first design but exist in the waveforms of the of the second design may be indicative of the existence of a bug or bugs in the code of the faulty design (the second design).

For example, if the code of the first design includes a condition "a equals b", then during the tests run on the first design whenever a was 0 b was 0 as well, and whenever a was 1 b was 1 too. If in the second faulty design that condition was not always obeyed, then at least in one instance the value of a and the value of b were not equal. This can be a result, for example, of an additional cycle in which only one signal was changed while the other signal remained unchanged, or perhaps it was caused by a bug in the code of the second design. In order to understand the cause of this the EDA tool may identify the exact simulation time or time window of the specific test that was run at which the abnormal value assignment took place and check at the corresponding simulation time or time window of the same test that was run on the first design to determine whether it was a or b that did not have the value it was meant to have (which is determined from the first properly functioning design). The signal that was found to have been assigned a value it was not supposed to have (in comparison with the same signals in the first design) at a given simulation time or time window may be flagged as a suspect for bug investigation. Finding more abnormal assignments per a given signal may increase the interest in that signal as it may increase the suspicion that a bug in the second faulty design is the cause of these abnormal assignments.

The timing of the occurrence of the suspicious behavior may also be rated. The more certain suspicious behavior occurs at the same simulation time or time window in different test the more it will be rated as suspicious as indicating a bug. For example, if signal "b" is found to exhibit abnormal behavior repeatedly at time "t" the EDA tool may indicate to the user (e.g., a debugging expert) to look into code in the second design pertaining to signal "b" at time "t".

In some embodiments of the present invention the EDA tool may include a debugger tool may be used, capable of performing driver tracing.

The two designs may be input and worked on in parallel (e.g., on two parallel GUI windows, and synchronized according to selected signals and time location). The EDA tool may identify signal "b", mark time "t" and present the user with the relevant code in the designs, thus pointing on the suspected code portion that the user may then wish to investigate.

FIG. 1 is a flow diagram of a debugging method, according to some embodiments of the present invention.

A debugging method according to some embodiments of the present invention includes obtaining waveforms 100 of signals recorded during execution of one or a plurality of tests on a first properly functioning version of a design. The method may also include obtaining waveforms 102 of signals recorded during execution of the one or plurality of tests on a second faulty version of the design.

A debugging method according to some embodiments of the present invention includes using a processor to extract 104 behavior patterns (e.g., passing behavior patterns 106) of the signals in the waveforms of the first design and behavior patterns (e.g., failing behavior patterns 108) of the signals in the waveforms of the second design.

A debugging method according to some embodiments of the present invention includes validating the signals for either or both versions of the design. And analysis 110 of the extracted behavior patterns to identify 112 one or more suspicious deviating patterns, e.g., deviations in signals of corresponding behavior patterns (of the first design and of the second design) of the extracted behavior patterns, mapping 114 suspicious signals to either or both versions of the design to obtain corresponding signals and to identify a simulation time or time window 116 for each of said one or more deviations in the signals of the corresponding behavior patterns of the extracted behavior patterns, during which that deviation occurred during the execution of the one or a plurality of tests.

A debugging method according to some embodiments of the present invention may also include using a debugger 118 (e.g., a debugger with driver tracing capabilities) to present a code 122 of the first design and a code 124 of the second design corresponding to the presented code of the first design, on an output device 120. The output device may include, for example, a display device (e.g., a monitor, a screen), which may correspond to output device 704 (see FIG. 3).

According to some embodiments of the present invention, the method may also include using the processor to present to a user via the output device 120 code of the first design pertaining to a deviation of the one or more deviations in corresponding behavior patterns of the extracted behavior patterns and the time or time window during which that deviation occurred.

The code of the first design 122 and the code of the second design 124 may be presented to the user (e.g., the debugging expert) side by side on a screen.

According to some embodiments of the present invention, the behavior patterns may be extracted using a property synthesis engine that does not require any knowledge of the design. Such engine may process simulation traces and can extract behavior patterns of a set of signals. According to some embodiments of the present invention, behavior patterns are behaviors that hold true throughout the waveform (also called the trace). The behavior patterns can include a behavior of a specific signal or a behavior of a group of signals. The behavior patterns can be temporal or non-temporal. For example: signal S1 is stuck at 1'b1, S2|=> (S3|S4), S5===~S6 and so on. These examples, if generated, hold true and valid throughout the trace.

A change may have been made to the code (e.g., register transfer level-RTL-code) of the design causing a test or several tests to fail. As a result, two sets of waveforms may be obtained, one set of waveforms relating to a properly functioning design (passing waveforms) and one set of waveforms relating to another version of the design, that underwent one or a few changes and exhibited some fails (failing waveforms). An EDA tool may extract behavior patterns from the passing waveforms, which may presumably be referred to as exhibiting "good" behaviors and the failing waveforms may be used to extract behavior patterns that may be referred to as exhibiting "bad" behaviors.

According to some embodiments of the present invention, an extracted behavior pattern may be classified as one of the following statuses:

(1) Matching behavior pattern, a behavior pattern that was extracted from the passing waveforms and was also identified in the failing waveforms;
(2) Violating behavior pattern, a behavior pattern that was extracted from the passing waveforms that was not identified in the failing waveforms; and
(3) New behavior pattern, a behavior pattern that was extracted from the failing waveforms but was not identified in the passing waveforms.

According to some embodiments of the invention an EDA tool may analyze the violating behavior patterns and the new behavior patterns and map them back to design signals. An identified violating behavior pattern may lead to a culprit signal that may be identified as the cause for that violating behavior in the failing waveforms. For example, A|->B was extracted from the passing waveforms, however, this behavior was violated on the failing waveforms. Although the reason for the violation may be clear (e.g., there is at least one cycle where A was asserted but B was not), it is not obvious what there was a change in the design that caused the violation. A change made to the RTL design may have caused B to become false at a certain cycle or the change may have caused A to be asserted one more cycle. The EDA tool may identify find the reason for the violating behavior by identifying a culprit signal, for example, by comparing the value of the signals in the passing waveforms and in the failing waveforms at the violation cycles. The same may apply for new behaviors. If a new behavior pattern is extracted from the failing waveforms, the EDA tool may identify a difference or differences between the passing waveforms and the failing waveforms to find the culprit signal or signals The culprit signals are a suspected list of signals that may have caused the failure.

According to some embodiments the EDA tool may rank the culprit signals based on several heuristics such as the number of identified violations, the number of identified new behaviors relating to the signal that was identified as a culprit signal, determining whether there was an actual change in the code of the design including this signal, the type of the behavior, etc.

According to some embodiments of the present invention, the processor may generate a rank (grading numbers) per signal for either or both versions of the design, based on the number of deviations identified in that signal with respect to the extracted behavior patterns. Signals may be displayed to user sorted in rank order to help localize the deviations. High rank signals have higher probability of being the source of the functional deviation.

The corresponding simulation times or time windows during which the identified behavior occurred may be extracted concurrently with identifying the culprit signals for the violating behaviors and for the new behaviors. If several violations/new behaviors occurred concurrently, the determined simulation times or time windows may be highly ranked.

According to some embodiments of the invention the EDA tool may provide a ranked list of culprit signals with the corresponding simulation times or time windows so as to allow the user to debug the design. In some embodiments the EDA tool may include a debugger that may open two sessions, one for the first passing version of design and one for the failing version of the design. Culprit signals may be highlighted along with their corresponding simulation times or time windows, localizing suspected bugs and allowing the user to immediately start the debugging process over the localized area in code of the design.

Figure 2:
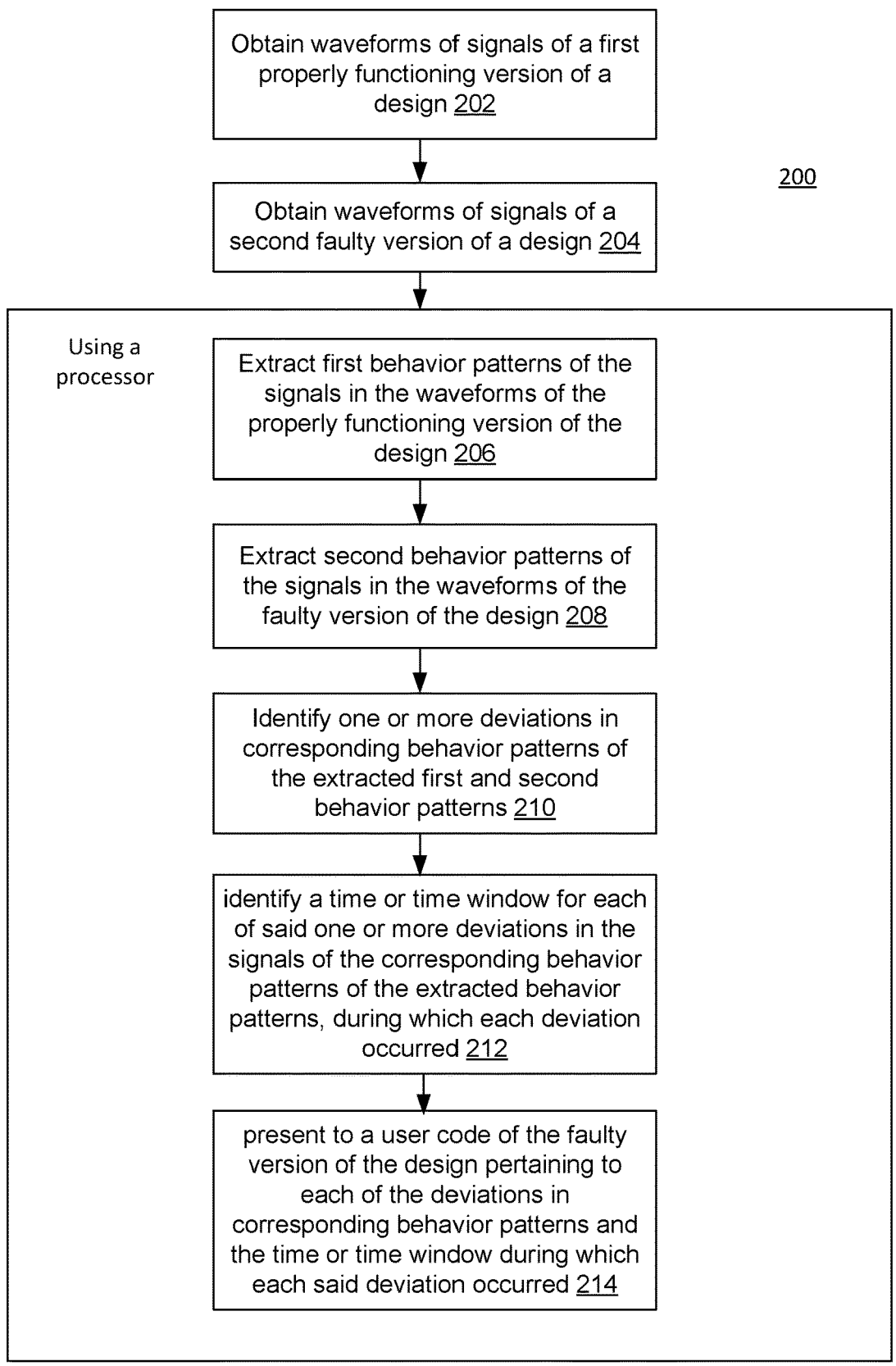
FIG. 2 shows a debugging method according to some embodiments of the present invention.

FIG. 2 shows a debugging method 200 according to some embodiments of the present invention.

Method 200 may include obtaining 202 waveforms of signals recorded during execution of one or a plurality of tests on a first properly functioning version of a design. The method may also include obtaining 204 waveforms of signals recorded during execution of said one or a plurality of tests on a second faulty version of the design.

Method 200 may include, using a processor to: extract 206 first behavior patterns of the signals in the waveforms of the properly functioning version of the design; extract 208 second behavior patterns of the signals in the waveforms of the faulty version of the design; identify 210 one or more deviations in corresponding behavior patterns of the extracted first and second behavior patterns; identify 212 a time or time window for each of said one or more deviations in the signals of the corresponding behavior patterns of the extracted behavior patterns, during which each said deviation occurred during the execution of the simulation tests; and present 214 to a user via an output device code of the faulty version of the design pertaining to each of said one or more deviations in corresponding behavior patterns of the extracted behavior patterns and the time or time window during which each said deviation occurred.

Figure 3:
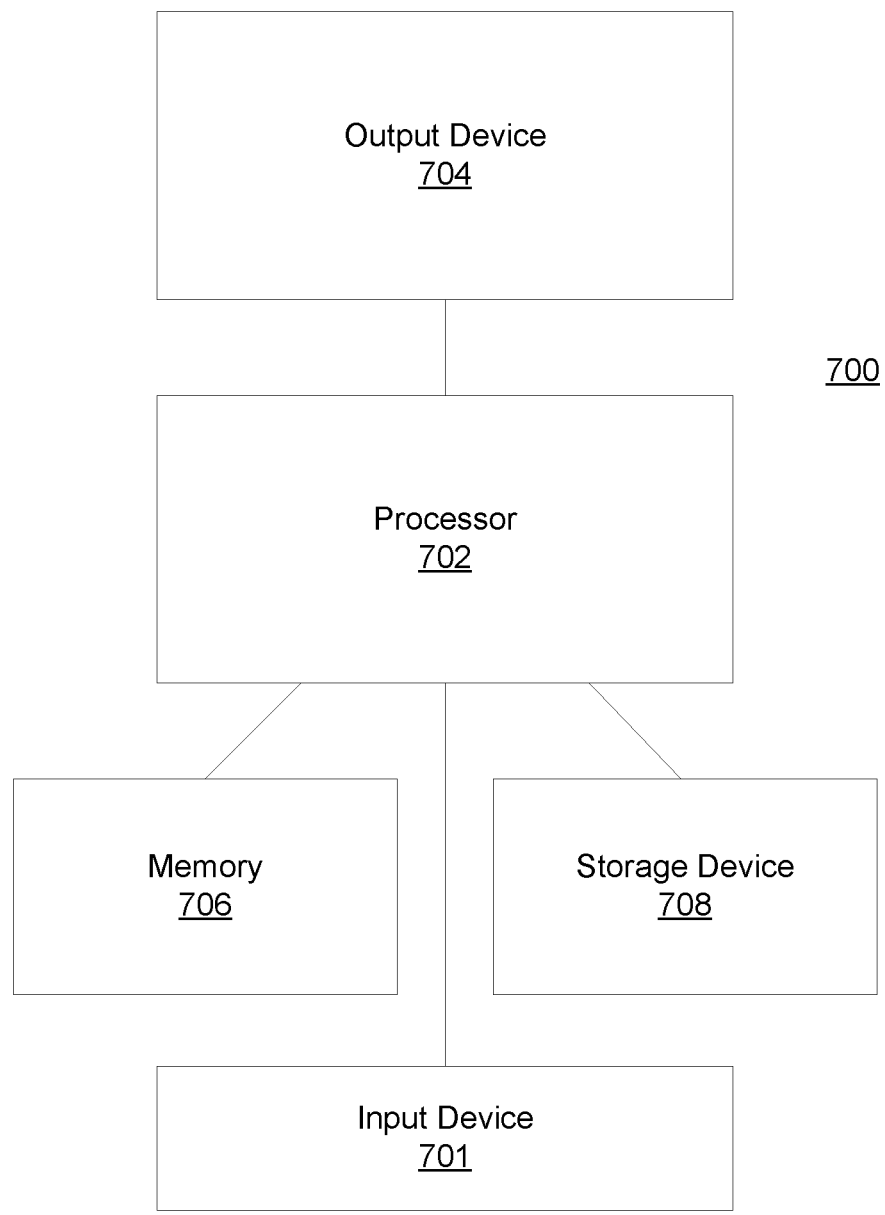
FIG. 3 is a block diagram of a debugging system according to some embodiments of the invention.

FIG. 3 is a block diagram of a system 700 according to some embodiments of the invention. System 700 may include a processor 702 (e.g. single processor or a processing unit made that includes a plurality of processors, on a single machine or distributed on a plurality of machines) for executing a method according to some embodiments of the present invention.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions are stored on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A debugging method comprising:
obtaining waveforms of signals recorded during execution of one or a plurality of tests on a first properly functioning version of a design;
obtaining waveforms of signals recorded during execution of said one or a plurality of tests on a second faulty version of the design;
using a processor to:
extract first behavior patterns of the signals in the waveforms of the properly functioning version of the design;
extract second behavior patterns of the signals in the waveforms of the faulty version of the design, wherein the first behavior pattern and the second behavior pattern include a behavior that holds true throughout a waveform;
identify one or more deviations in corresponding behavior patterns of the extracted first and second behavior patterns;
identify a time or time window for each of said one or more deviations in the signals of the corresponding behavior patterns of the first and second behavior patterns, during which each said deviation occurred during the execution of one or more simulation tests; and
present to a user via an output device code of the faulty version of the design pertaining to each of said one or more deviations in corresponding behavior patterns of the first and second behavior patterns and the time or time window during which each said deviation occurred.

2. The method of claim 1 further comprising using the processor to present to a user via the output device code of the properly functioning version of the design pertaining to a deviation of the one or more deviations in corresponding behavior patterns of the first and second behavior patterns and the time or time window during which each said deviation occurred.

3. The method of claim 1, wherein identifying one or more deviations in corresponding behavior patterns of the first and second behavior patterns comprises identifying behavior patterns that are not found in the waveforms of the faulty version of the design but exist in the waveforms of the properly functioning version of the design.

4. The method of claim 1, wherein identifying one or more deviations in corresponding behavior patterns of the first and second behavior patterns comprises identifying behavior patterns that are not found in the waveforms of the properly functioning version of the design but exist in the waveforms of the faulty version of the design.

5. The method of claim 1, further comprising using the processor to validate the signals for either or both versions of the design.

6. The method of claim 1, further comprising using the processor to rank signals in the waveforms of either the faulty version of the design or the properly functioning version of the design by a number of deviations identified in each of said signals.

7. The method of claim 6, wherein presenting to the user via the output device code of the faulty version of the design pertaining to each of said one or more deviations comprises presenting to the user via the output device code of the faulty version of the design pertaining to each of said one or more deviations in an order corresponding to a rank of the ranked signals.

8. A debugging system comprising:
memory and
a processor configured to:
record waveforms of signals during execution of one or a plurality of tests on a properly functioning version of a design;
record waveforms of signals during execution of said one or a plurality of tests on a faulty version of the design;
extract first behavior patterns of the signals in the waveforms of the properly functioning version of the design;
extract second behavior patterns of the signals in the waveforms of the faulty version of the design, wherein the first behavior pattern and the second behavior pattern include a behavior that holds true throughout a waveform;

identify one or more deviations in corresponding behavior patterns of the extracted first and second behavior patterns;

identify a simulation time or time window for each of said one or more deviations in the signals of the corresponding behavior patterns of the first and second behavior patterns, during which each said deviation occurred during the execution of one or more simulation tests; and present to a user via an output device code of a second design pertaining to each of said one or more deviations in corresponding behavior patterns of the first and second behavior patterns and a time or time window during which each said deviation occurred.

9. The system of claim 8 wherein the processor is further configured to present to a user via the output device code of the properly functioning version of the design pertaining to a deviation of the one or more deviations in corresponding behavior patterns of the first and second behavior patterns and a time or time window during which each said deviation occurred.

10. The system of claim 9, wherein the processor is configured to present the code of the properly functioning version of the design and the code of the faulty version of the design side by side on the output device.

11. The system of claim 8, comprising the output device.

12. The system of claim 11, wherein the output device is a display device.

13. The system of claim 8, wherein the processor is configured when identifying one or more deviations in corresponding behavior patterns of the first and second behavior patterns to identify behavior patterns that are not found in the waveforms of the faulty version of the design but exist in the waveforms of the properly functioning version of the design.

14. The system of claim 8, wherein the processor is configured when identifying one or more deviations in corresponding behavior patterns of the first and second behavior patterns to identify behavior patterns that are not found in the waveforms of the properly functioning version of the design but exist in the waveforms of the faulty version of the design.

15. The system of claim 8, wherein the processor is further configured to processor to rank signals in the waveforms of either the faulty version of the design or the properly functioning version of the design by a number of deviations identified in each of said signals.

16. A non-transitory computer readable storage medium for debugging having stored thereon instructions that when executed by a processor will cause the processor to:

record waveforms of signals during execution of simulation tests on a properly functioning version of a design;

record waveforms of signals during execution of the simulation tests on a faulty version of the design;

extract first behavior patterns of the signals in the waveforms of the properly functioning version of the design;

extract second behavior patterns of the signals in the waveforms of the faulty version of the design, wherein the first behavior pattern and the second behavior pattern include a behavior that holds true throughout a waveform;

identify one or more deviations in corresponding behavior patterns of the first and second behavior patterns;

identify a simulation time or time window for each of said one or more deviations in the signals of the corresponding behavior patterns of the extracted first and second behavior patterns, during which each said deviation occurred during the execution of the simulation tests; and present to a user via an output device code of a second design pertaining to a deviation of the one or more deviations in corresponding behavior patterns of the first and second behavior patterns and a time or time window during which each said deviation occurred.

17. The non-transitory computer readable storage medium of claim 16 wherein the instructions when executed will cause the processor to present to a user via the output device code of the properly functioning version of the design pertaining to a deviation of the one or more deviations in corresponding behavior patterns of the first and second behavior patterns and a time or time window during which each said deviation occurred.

18. The non-transitory computer readable storage medium of claim 17 wherein the instructions when executed will cause the processor to present the code of the properly functioning version of the design and the code of the faulty version of the design side by side on the output device.

19. The non-transitory computer readable storage medium of claim 16 wherein the instructions when executed will cause the processor, when identifying one or more deviations in corresponding behavior patterns of the first and second behavior Page 7 patterns to identify one or more deviations in behavior patterns of a behavior pattern extracted from the faulty version of the design.

20. The non-transitory computer readable storage medium of claim 16 wherein the instructions when executed will cause the processor when identifying one or more deviations in corresponding behavior patterns of the first and second behavior patterns to identify behavior patterns that are not found in the waveforms of a second design but exist in the waveforms of a first design and to identify behavior patterns that are not found in the waveforms of the first design but exist in the waveforms of a second design.

* * * * *